(12) United States Patent
Paxton

(10) Patent No.: US 7,097,408 B2
(45) Date of Patent: Aug. 29, 2006

(54) PERSONAL PONTOON WATERCRAFT TRANSPORT RACK

(76) Inventor: Edward L. Paxton, 556 N. 320 East, Salem, UT (US) 84653

( * ) Notice: Subject to any disclaimer, the term of this patent is extended or adjusted under 35 U.S.C. 154(b) by 0 days.

(21) Appl. No.: 10/420,186

(22) Filed: Apr. 22, 2003

(65) Prior Publication Data

US 2004/0213654 A1 Oct. 28, 2004

(51) Int. Cl.
*B60R 9/00* (2006.01)
(52) U.S. Cl. .................. 414/462; 224/504; 224/519
(58) Field of Classification Search ............... 224/502, 224/504, 505, 506, 508, 519, 521; 414/462
See application file for complete search history.

(56) References Cited

U.S. PATENT DOCUMENTS

| | | | |
|---|---|---|---|
| 3,796,333 A | 3/1974 | Goldstein | |
| 4,277,008 A | 7/1981 | McCleary | 224/273 |
| 4,561,575 A * | 12/1985 | Jones | 224/42.21 |
| 4,635,835 A | 1/1987 | Cole | 224/42.08 |
| 4,676,414 A | 6/1987 | Deguevara | 224/42.03 |
| 4,813,584 A | 3/1989 | Wiley | 224/42.44 |
| 4,815,638 A | 3/1989 | Hutyra | 224/42.03 B |
| 4,823,997 A | 4/1989 | Krieger | 224/42.03 B |
| 4,906,015 A | 3/1990 | LaCroix et al. | 280/415.1 |
| 5,067,640 A | 11/1991 | Gaskill | 224/42.07 |
| 5,370,285 A * | 12/1994 | Steelman | 224/42.21 |
| 5,373,978 A * | 12/1994 | Buttchen et al. | 224/510 |
| 5,443,189 A * | 8/1995 | Hirschfeld | 224/501 |
| 5,449,101 A * | 9/1995 | Van Dusen | 224/506 |
| 5,469,998 A * | 11/1995 | Van Dusen et al. | 224/506 |
| 5,492,454 A | 2/1996 | Colyer | 414/462 |
| 5,524,914 A | 6/1996 | Doherty et al. | 280/24 |
| 5,542,810 A | 8/1996 | Florus | 414/538 |
| 5,685,686 A * | 11/1997 | Burns | 414/462 |
| 5,690,260 A * | 11/1997 | Aikins et al. | 224/505 |
| 5,704,756 A | 1/1998 | Marteney et al. | 414/495 |
| 5,722,809 A | 3/1998 | Urbank | 414/529 |
| 5,730,345 A * | 3/1998 | Yeckley et al. | 224/505 |
| 5,752,799 A | 5/1998 | Carey et al. | 414/543 |
| 5,810,546 A | 9/1998 | Schmoling | 414/538 |
| 5,845,831 A * | 12/1998 | Nusbaum et al. | 224/505 |
| 5,882,170 A | 3/1999 | Walton | 414/462 |
| 6,129,371 A * | 10/2000 | Powell | 280/461.1 |
| 6,210,096 B1 | 4/2001 | Fielder | 414/522 |
| 6,357,991 B1 | 3/2002 | Hamlett | 414/538 |
| 6,361,060 B1 | 3/2002 | Kamminga | 280/414.1 |
| 6,367,866 B1 | 4/2002 | Moore | 296/181 |
| 6,655,562 B1 * | 12/2003 | Jeong | 224/282 |
| 6,854,630 B1 * | 2/2005 | Anderson et al. | 224/536 |
| 2001/0035446 A1 * | 11/2001 | Walstrom et al. | 224/501 |
| 2002/0145021 A1 * | 10/2002 | Weaver | 224/521 |
| 2004/0084493 A1 * | 5/2004 | Young et al. | 224/506 |

* cited by examiner

*Primary Examiner*—James W. Keenan
(74) *Attorney, Agent, or Firm*—J. David Nelson

(57) ABSTRACT

A rack for transporting personal pontoon watercraft. The rack has an anchor member which inserts in a standard trailer hitch receptacle and a support structure to which the watercraft is attached. Pivoting embodiments also have a pivot hinge which provides for the support structure to pivot between a down position for loading and an up position for transport, and a support brace which secures the rack in an up or transport position. The pivot hinge attaches the bottom end of the support structure to the rear end of the anchor member. The support structure includes one or more pairs of cradles into which the deck of the watercraft is slid which hold the watercraft in a vertical position for transport.

52 Claims, 15 Drawing Sheets

PERSONAL PONTOON WATERCRAFT TRANSPORT RACK

FIELD OF INVENTION

The present invention is in the field of watercraft transport racks for vehicles and in particular in the field of trailer hitch mounted transport racks for personal flotation type watercraft.

BACKGROUND OF THE INVENTION

Personal flotation type watercraft have become very popular for use in fishing and other water activities. In particular the inflatable pontoon type personal watercraft has rapidly grown in popularity over the last few years. These watercraft typically consist of a pair of inflatable and streamlined pontoons, a deck, a pontoon connection structure and a means for securing the pontoons to the pontoon connection structure. A common means are straps, usually two for each pontoon which are connected to buckles which are permanently affixed to each side of the pontoons. These straps are then secured to the pontoon connection structure which in turn is attached to the deck. This type of watercraft offers a safer alternative to canoes, rafts and tube type craft. These type of craft are readily adaptable to electric and gasoline motors. They offer enhanced stability in rough water conditions.

Personal pontoon watercraft typically weigh fifty to eighty pounds. The loading and transporting of such a watercraft without deflating the pontoons and disassembling the pontoons from the deck structure is time consuming. A transport device is needed that will provide for the ease of loading of the watercraft and provide for it to be secured to a vehicle for transport in a fully assembled and fully inflated configuration. Because of the length of the typical personal pontoon watercraft, the watercraft would need to be transported in a tipped up position if it is to be attached to the rear of a vehicle. For ease of use, the device needs to be attachable to a standard trailer hitch. While various types of racks for personal watercraft and other types of sports accessories appear in a prior art, none provide for the transport of pontoon type personal watercraft by attachment to and suspension from a standard trailer hitch.

It is therefore the objective of the present invention to provide a transport rack for pontoon type personal watercraft.

It is the further objective of the present invention to provide a transport rack for a pontoon type personal watercraft that is attached to and suspended from a typical trailer hitch.

It is the further objective of the present invention to provide a personal pontoon watercraft transport rack which will facilitate the attachment of the watercraft to the rack while the watercraft is in a horizontal position on the ground or on water, provide for tipping of the watercraft and the rack from a down or load position to an up or transport position after being attached to the rack and provide for lowering of the watercraft and the rack from the transport position to the load position with the watercraft on or near the ground or on or near the water for ease of unattaching and unloading the watercraft.

SUMMARY OF THE INVENTION

A typical personal pontoon watercraft is comprised of a pair of inflatable, streamlined pontoons, a deck, a pontoon connection structure and a means for securing the pontoons to the pontoon connection structure. A common means are straps, usually two for each pontoon which are connected to buckles which are permanently affixed to each side of the pontoons. These straps are then secured to the pontoon connection structure which in turn is attached to the deck.

The present invention is a personal pontoon watercraft transport rack comprised of a horizontal anchor member which fits in a standard trailer hitch receptacle, a support structure which is comprised of a support member and a pair of cradle structures affixed to the support member for supporting opposing sides of the deck of a personal pontoon watercraft, and a pivot hinge which connects the rear of the anchor member to the bottom of the support structure. The pivot hinge provides for pivoting the support structure from a horizontal load position where the deck of the personal pontoon watercraft is slid into the cradle structures to a vertical transport position. A support pedestal which is attached to the support member maintains the support structure in a roughly horizontal position for ease of loading and unloading, when the rack is in the load position. A pair of support braces secures the support structure in the transport position for transport.

Embodiments of rack which provide for the transport of two watercraft may merely have two pairs of opposing cradles with the deck of the first watercraft being inserted in one pair and the deck of the second watercraft being inserted in the second pair. Embodiments may provide for the second watercraft to be loaded in an upright position or may provide for it to be loaded in an inverted position.

Other embodiments used for transport of two or more watercraft have an anchor member with a longitudinal segment for insertion in the trailer hitch receptacle and a lateral segment with a left lateral stub member extending laterally to the left and a right lateral stub member extending laterally to the right respectively from the rear end of the anchor member. A respective support structure which carries one or more watercraft is connected to each end of the lateral segment of the anchor member by a respective pivot hinge which provides for the lateral pivoting of the support structure between a load position and a transport position. A pair of crossing braces or pairs of support braces secures each of the support structures in its respective transport position.

An optional anchor member receptacle in the rear of the anchor member of any embodiment allows the insertion of a second anchor member of another rack, thereby providing for piggybacking of the racks.

Other optional features include means for adjusting the width of the cradle structures, thereby accommodating watercraft of varying deck widths and retainer clips to secure the watercraft in place after it is loaded onto the rack.

DETAILED DESCRIPTION OF PREFERRED EMBODIMENTS

Figure 1:
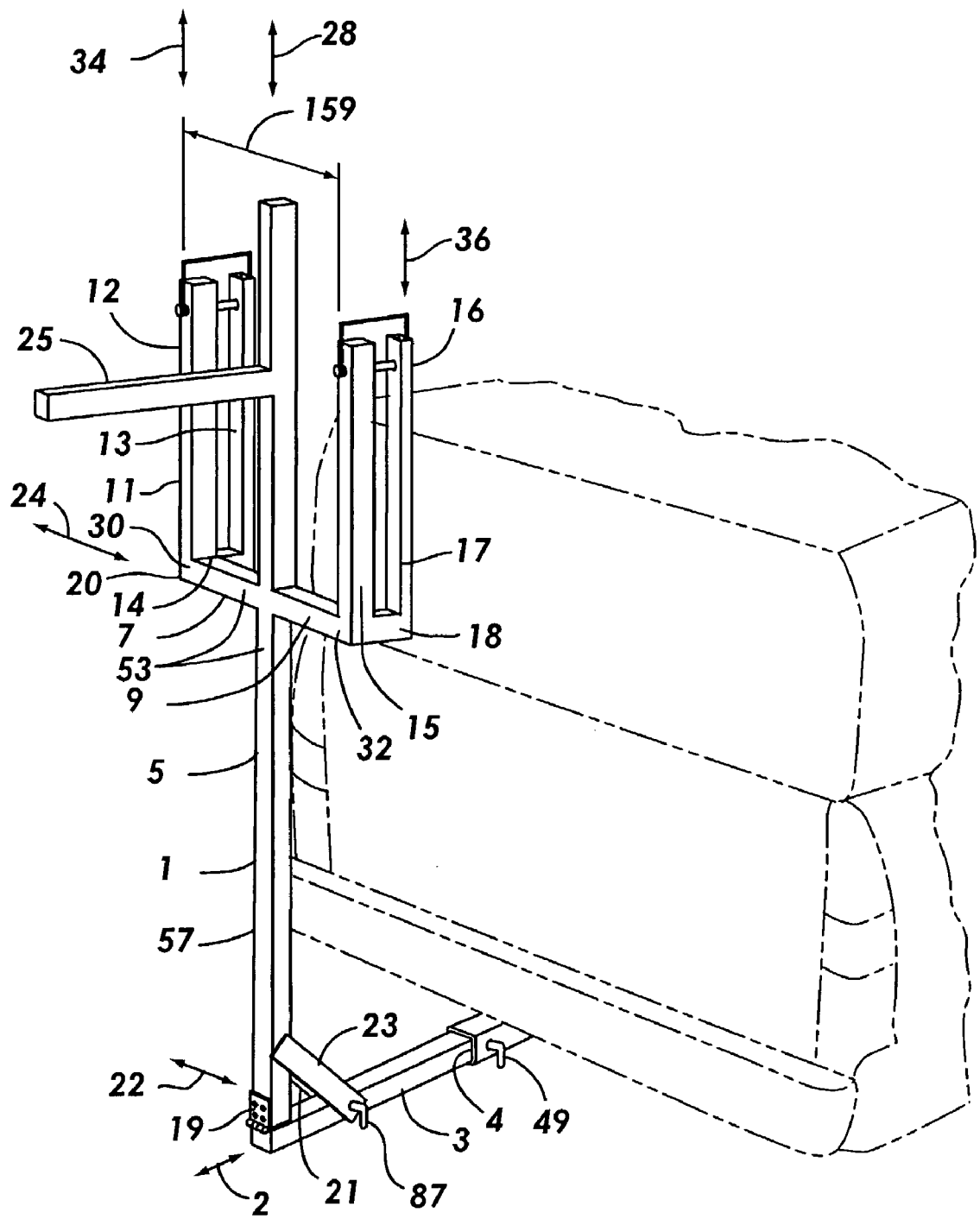
FIG. 1 is a side perspective view of a preferred embodiment of a personal pontoon watercraft rack of the present invention in a transport position.

Referring first to FIG. 1 a preferred embodiment of the personal pontoon watercraft transport rack 1, hereinafter referred to as the "rack", of the present invention is shown. This embodiment is comprised of an anchor member 3, support member 5, left cross member 7, right cross member 9, left front cradle member 11, left rear cradle member 13, left cradle cross member 14, right front cradle member 15, right rear cradle member 17, right cradle cross member 18, pivot hinge 19, left support brace 21 and right support brace 23 and support pedestal. For this embodiment, the anchor member axis 2 is longitudinal, that is alined with the trailer hitch. The left front cradle member, the left cradle cross member and the left rear cradle member form a left cradle 12 and the right front cradle member, the right cradle cross member and the right rear cradle member form a right cradle 16. The left cross member, the left cradle, the right cross member and the right cradle comprise a cradle structure 20. For this embodiment, the left cross member and the right cross member are affixed to opposing sides of the support member, are perpendicular to the support member, and have a cross member axis 24 which is transverse to the anchor member axis 2 and to the support member axis 28. The left cradle is affixed to the left cross member outside end 30 and the right cradle is affixed to the right cross member outside end 32. The left cradle axis 34 and the right cradle axis 36 are perpendicular to the cross member axis and are alined with the support member axis.

Figure 2:
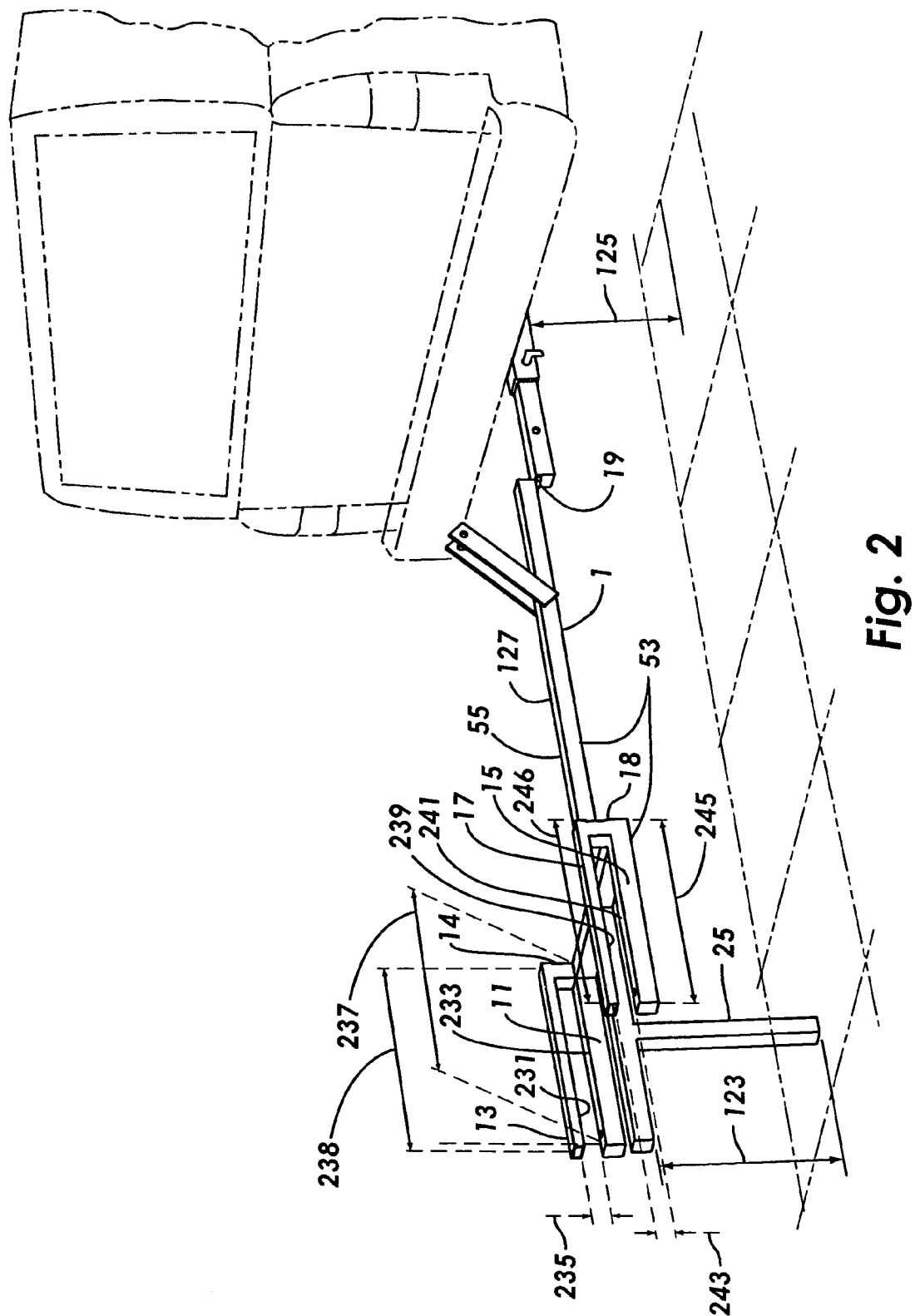
FIG. 2 is a side perspective view of a preferred embodiment of a personal pontoon watercraft rack of the present invention in a load position.

Referring to FIG. 2, the support pedestal 25 has a length 123 which is preferably approximately equal to the height 125 of the trailer hitch above the ground. The support pedestal therefore maintains the support structure 53 in a roughly horizontal position 127 for ease of loading and unloading, when the rack is in the loading position as shown in FIG. 2.

Figure 10:
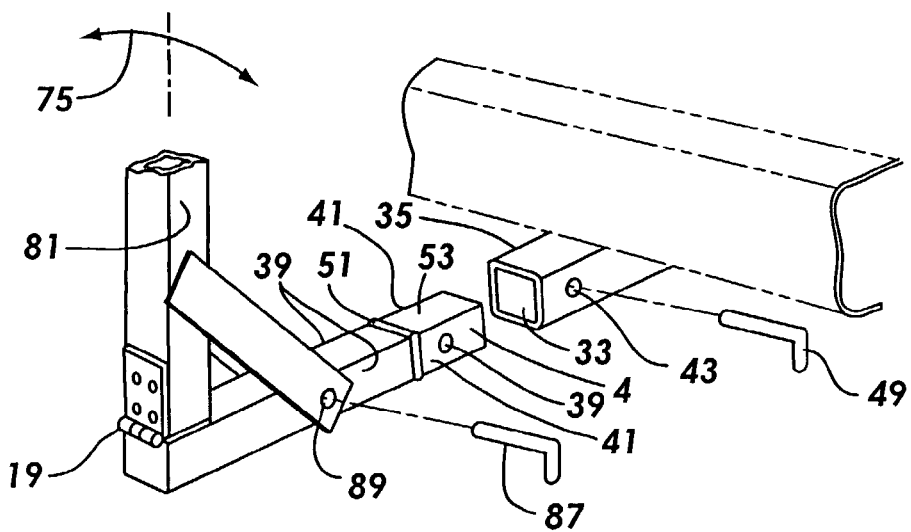
FIG. 10 is a side view perspective detail of an anchor member, pivot hinge and support brace of a personal pontoon watercraft rack in a transport position.
Figure 11:
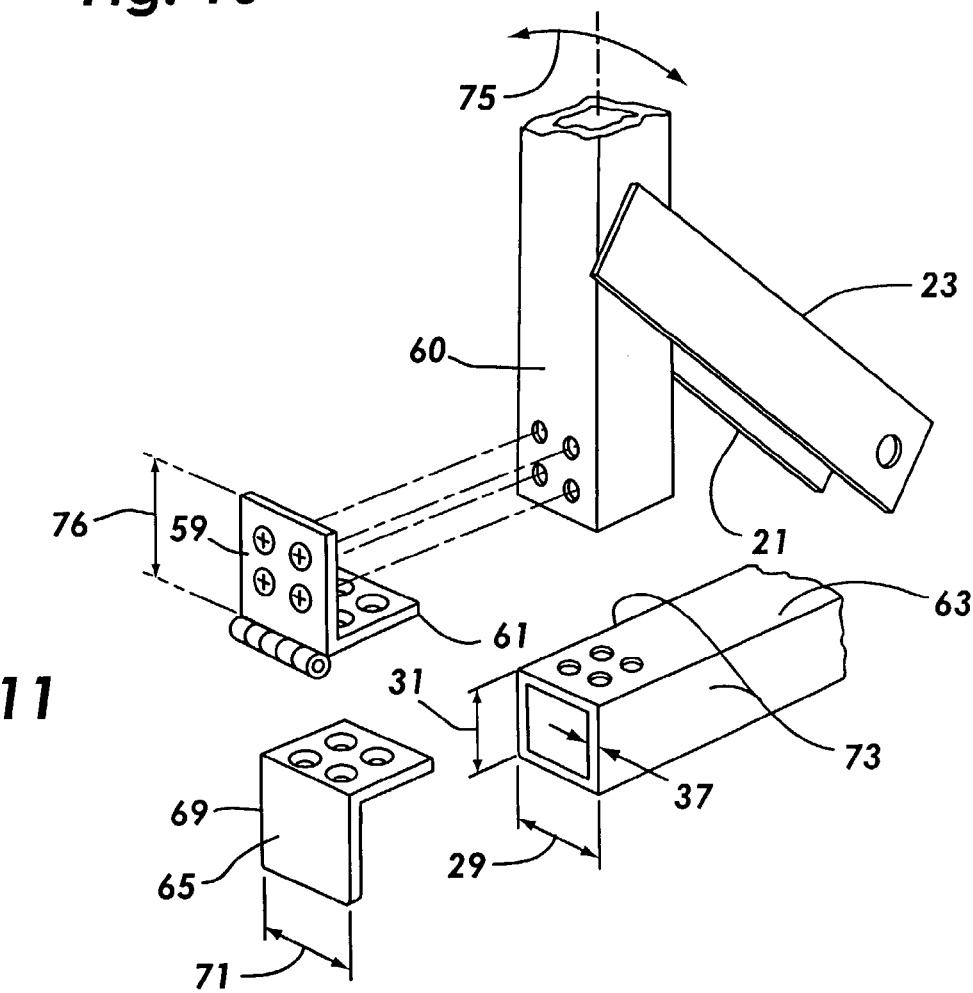
FIG. 11 is an exploded side view perspective detail of an embodiment of a pivot hinge and a support brace of a personal pontoon watercraft rack in a transport position.

For a preferred embodiment, the anchor member 3 is constructed of square cross section tubing 27 as shown in FIG. 11 having an insertion end 4 with a width 29 and depth 31 selected to fit snugly when inserted into the receptacle 33 of a standard trailer hitch 35 as shown in FIG. 10. Similarly, the support member, left cross member, right cross member, left front cradle member, left rear cradle member, left cradle cross member, right front cradle member, right rear cradle member, right cradle cross member, and support pedestal are for the preferred embodiments shown, constructed of square cross section tubing. The type of material, and the wall thickness 37 of the anchor member as well as the other tubular components will preferably be selected to provide adequate strength, stability and durability while minimizing weight and cost. The inventor has found that standard steel tubing works well for this purpose and while greater strength will ordinarily be required for the anchor member than for the other tubular components, for ease of construction the inventor has found that constructing the rack of tubing with a uniform cross section and wall thickness simplifies the fabrication process and eliminates the possibility of tubing of inadequate strength being used for the anchor member or other tubular components. However, weight reduction and material costs reduction can be achieved by the use of a different wall thickness tubing and even tubing of differing cross sections. Further, since the support member is connected to the anchor member by a pivot hinge, different types and sizes of materials could be used for the tubular components. Further, although for the preferred embodiments shown in FIG. 1, the tubular components of the support structure 53, comprised of the support member, the left cradle, the right cradle and the support pedestal are welded together, other means and methods of connecting the tubular components will be known to persons skilled in the art, enabling the use of differing materials for construction of the rack. Further, although a tubular material, and in particular square tubular material, is preferred by the inventor, the use of tubular material with differing cross sections and the use of solid materials of square or other cross sections, is feasible for other embodiments. Although most of the commonly used trailer hitches have a receptacle with a square cross section, thereby making an anchor member insertion end with a square cross section preferable for most embodiments, the rest of the anchor member and the rest of the components of the rack do not necessary need to have the same cross section or the same wall thickness as the anchor member insertion end.

Steel, aluminum, fiberglass, composites, reinforced fiberglass and other types of metallic and non-metallic materials can be used for the structural and non-structural components of the rack, strength, durability, cost and weight being the primary considerations in the selection of materials. Rigidity will also be a major consideration with highly rigid materials being preferred to minimize movement of the rack and the watercraft during transport.

Referring again to FIG. 1 and FIG. 10, for the preferred embodiment shown, the anchor member insertion end has lateral hitch pin holes 39 on opposing sides 41 of the anchor member having the same diameter as the hitch pin receptacles 43 of the hitch 35. The hitch pin holes are positioned in the insertion end so as to be alined with the hitch pin receptacles when the insertion end is inserted in the trailer hitch receptacle, thereby providing for the insertion of a hitch pin 49 through the hitch pin receptacles and the hitch pin holes, securing the rack to the hitch. Other secure means for securing the insertion end of the anchor member in the trailer hitch receptacle will be known in the art. One example is a screw driven expanding insertion end. However, secure means providing for the use of a hitch pin are preferable since a hitch pin is the most commonly used means for attaching an item to a trailer hitch. To facilitate the insertion of the anchor member in the hitch and to facilitate alignment of the hitch pin receptacles and the hitch pin holes, a hitch collar 51 can be constructed on one or more external surfaces 53 of the anchor member. This can be merely a weld bead. Alternatively, the insertion end of the anchor member may be sized for insertion in the trailer hitch receptacle with the rest of the anchor member having a larger size, the size transition serving as a hitch collar.

Figure 3:
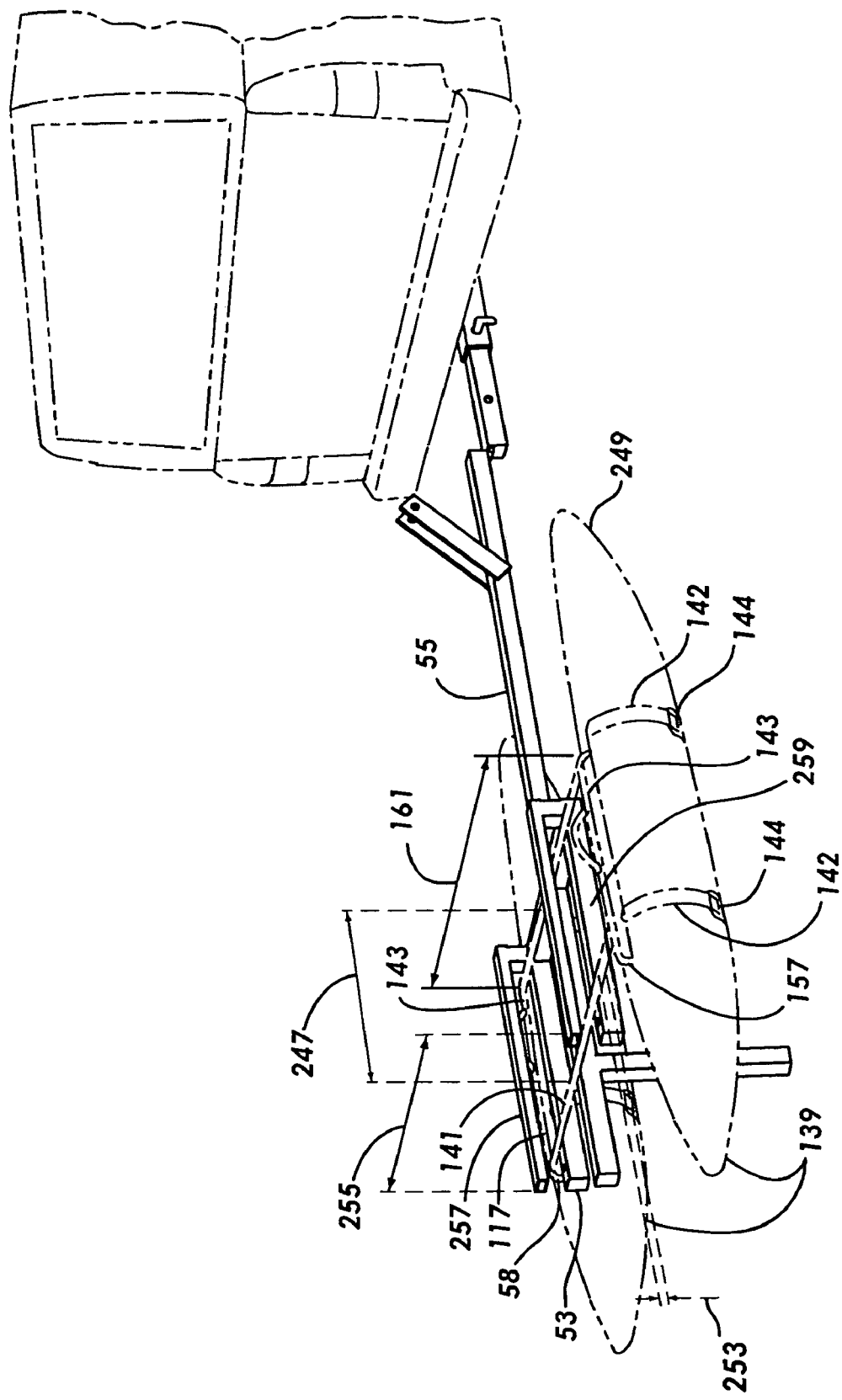
FIG. 3 is a side perspective view of a preferred embodiment of a personal pontoon watercraft rack of the present invention in a load position with personal pontoon watercraft loaded.
Figure 4:
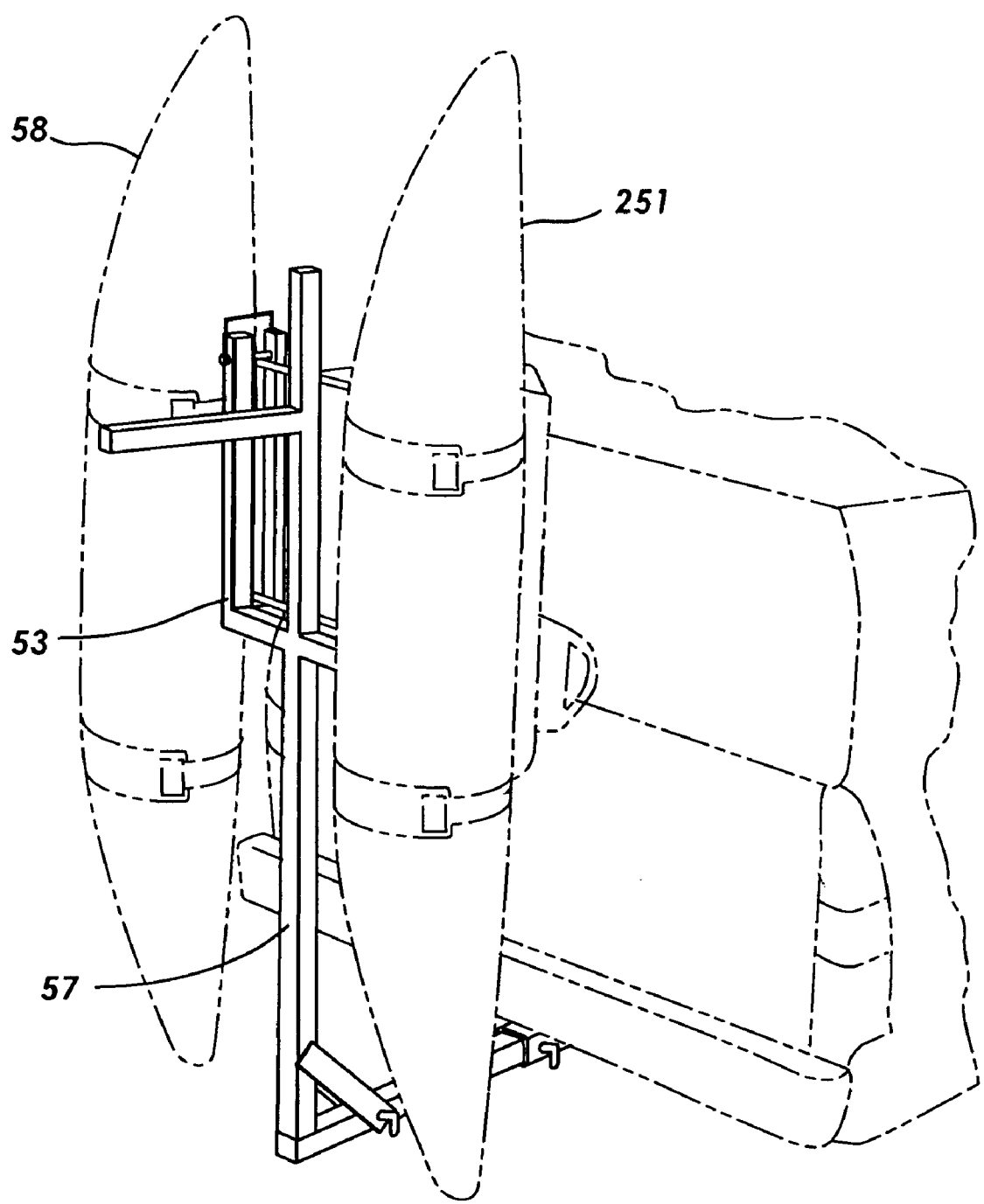
FIG. 4 is a side perspective view of a preferred embodiment of a personal pontoon watercraft rack of the present invention in a transport position with personal pontoon watercraft loaded.

For this embodiment, which is a longitudinally pivoting embodiment, the pivot hinge 19 has a lateral axis of rotation 22 which provides for the support structure 53 of the rack to pivot from the down or load position 55 as shown in FIG. 2 to the up or transport position 57 as shown in FIG. 1. While the pivot hinge shown in FIG. 1 and FIG. 10 is a traditional hinge, "pivot hinge" for purposes of this specification shall be defined as any pivot means known in the art providing for pivoting of the support structure between the load position and the transport position. The personal pontoon watercraft 58, hereinafter referred to as the "watercraft", is loaded onto and secured to the support structure 53 of the rack in the load position as shown in FIG. 3 and then the support structure with the watercraft secured, is raised to the transport position 57 by pivoting at the hinge. Referring again to FIG. 11 and FIG. 5, if the top hinge plate 59 is affixed to the support member rear surface 60 and the bottom hinge plate 61 is affixed to the anchor member top surface 63, an anchor member end cap 65 may enhance the stability and durability of the rack. The inventor prefers a short section of structural angle 69 for an anchor member end cap as shown in FIG. 11 but the length 71 can vary. The anchor member end cap length 71 can be increased such that the anchor member end cap extends beyond the anchor member outside surfaces 73 thereby allowing the use of a hinge with a larger bottom hinge plate and thereby increasing the strength of the rack for roll movement 75 during transport. Similarly, the height 76 of the top hinge plate can be increased to increase the strength of the rack for roll movement.

Figure 5:
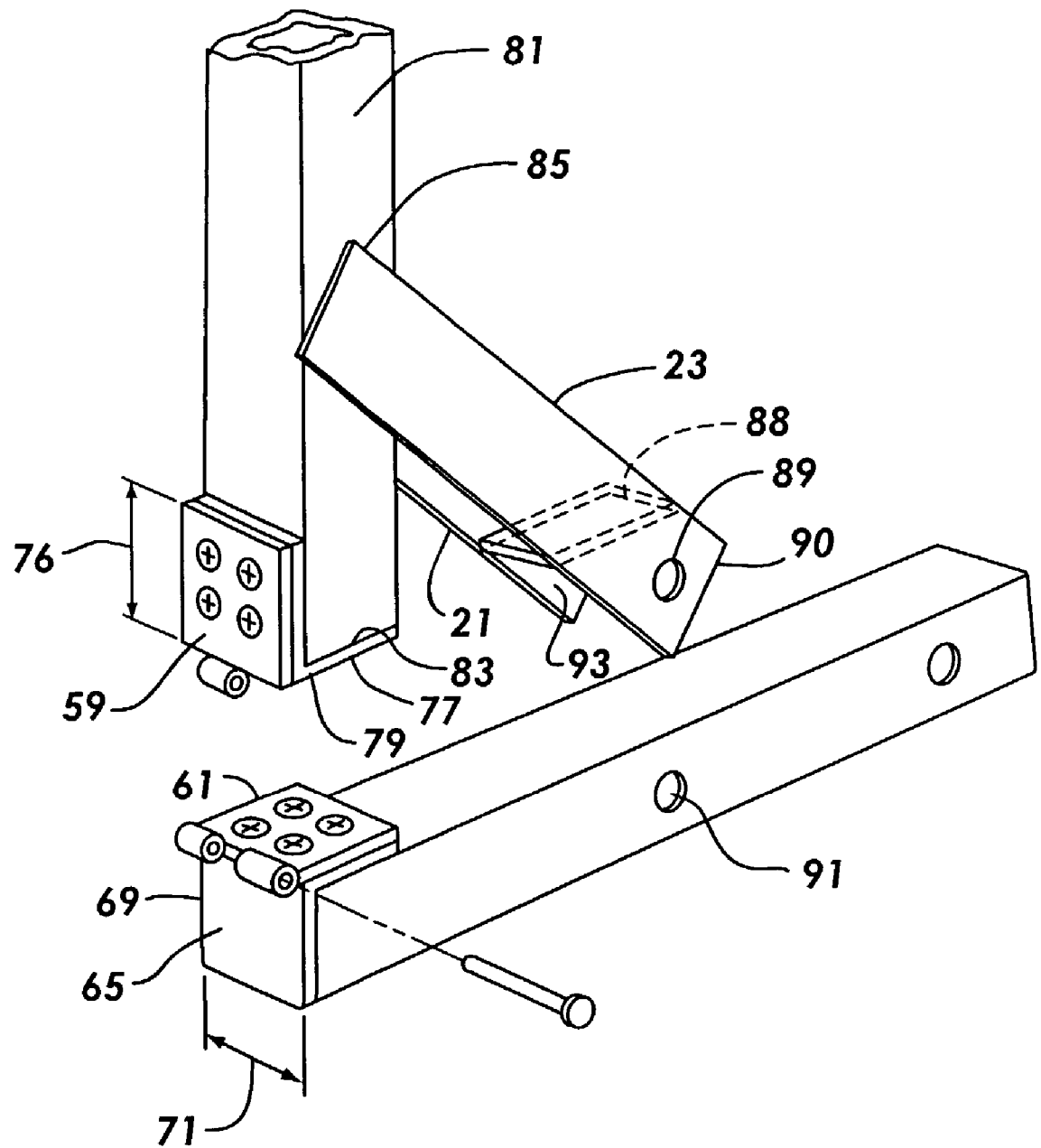
FIG. 5 is an exploded side view perspective detail of a pivot hinge and support brace of a personal pontoon watercraft of a preferred embodiment of a personal pontoon watercraft rack of the present invention in a transport position.

Referring now to FIG. 5, if a length of structural angle is used as a structural member end cap 77 the length of the support member end cap may be increased so that the ends 79 of the structural member end cap extend beyond the support member outside surfaces 81. Whether a support member end plate is used or not, a preferred embodiment will provide for the support member bottom end 83 or the support member end plate, whichever the case may be, to rest upon the hinge bottom plate when the rack is in the transport position. This increases the stability during transport and reduces the stress on the hinge.

Referring to FIG. 1, FIG. 5 and FIG. 10, the rack is retained in the transport position 57 by a left support brace 21 and right support brace 23. The top end 85 of each of these support braces may be welded to the outside surfaces 81 respectively of the support member and secured to the anchor member by the insertion of a brace pin 87 through brace pin apertures 89 in the anchor end 90 of the braces which are aligned with brace pin receptacles 91 in the anchor member when the rack is in the transport position, the brace pin being inserted through the brace pin apertures and the brace pin receptacles. Alternatively, the support braces may be pivotally affixed to the support member by a pivot pin inserted through pivot apertures 92 in the top end 85 of the support braces and pivot receptacles 94 in the support member. For the embodiment of the support braces shown in FIG. 5, a pivot stop 88, which can be a weld bead on the inside surface 93 of one or both of the support braces or can be a plate affixed to the respective inside surfaces of the support braces, provides for the ready positioning of the support braces for insertion of a brace pin when the support member 5 is pivoted to the transport position 57.

Figure 6:
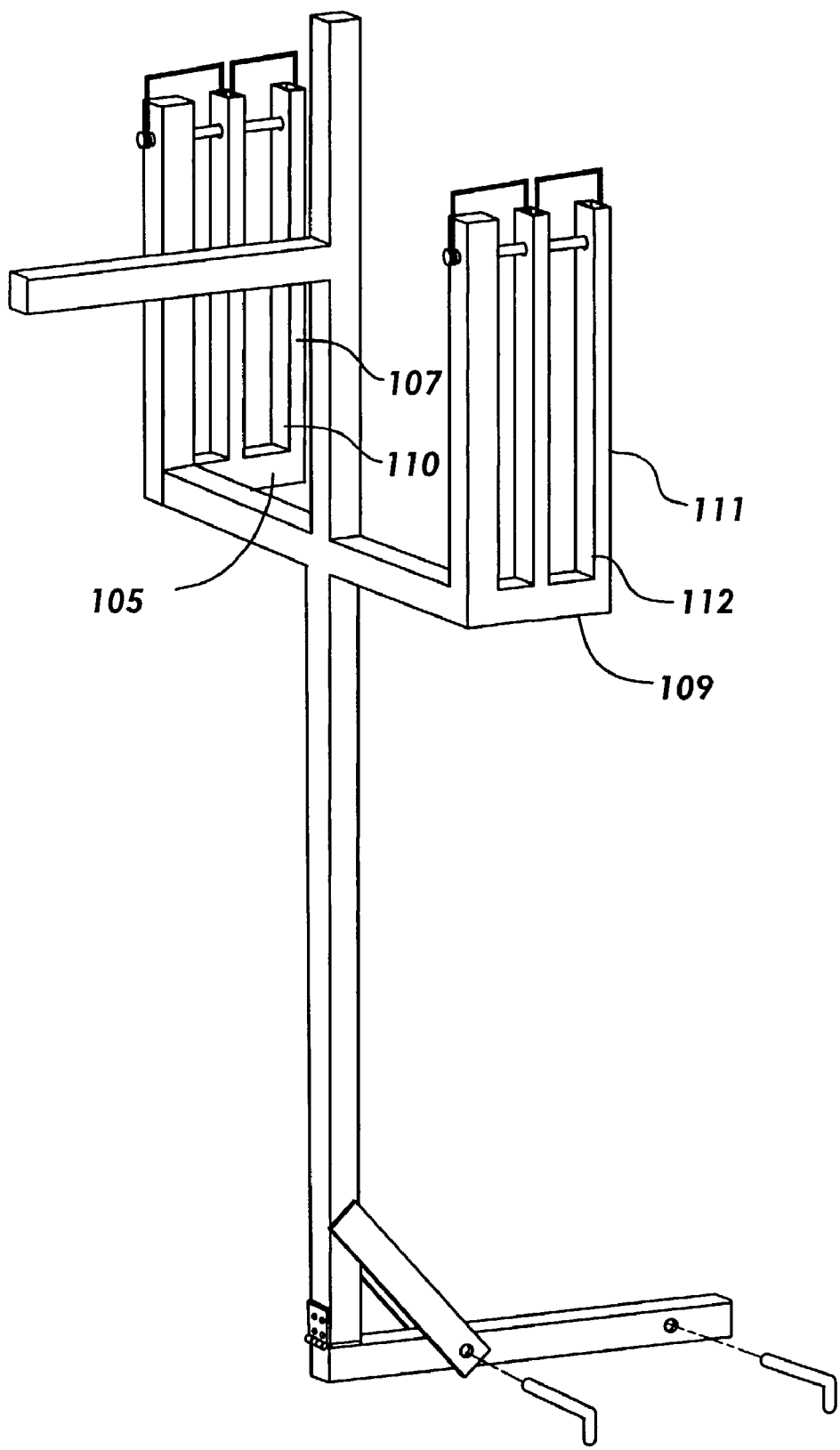
FIG. 6 is a side view perspective of an embodiment of a personal pontoon watercraft rack for transporting of two personal watercraft.
Figure 7:
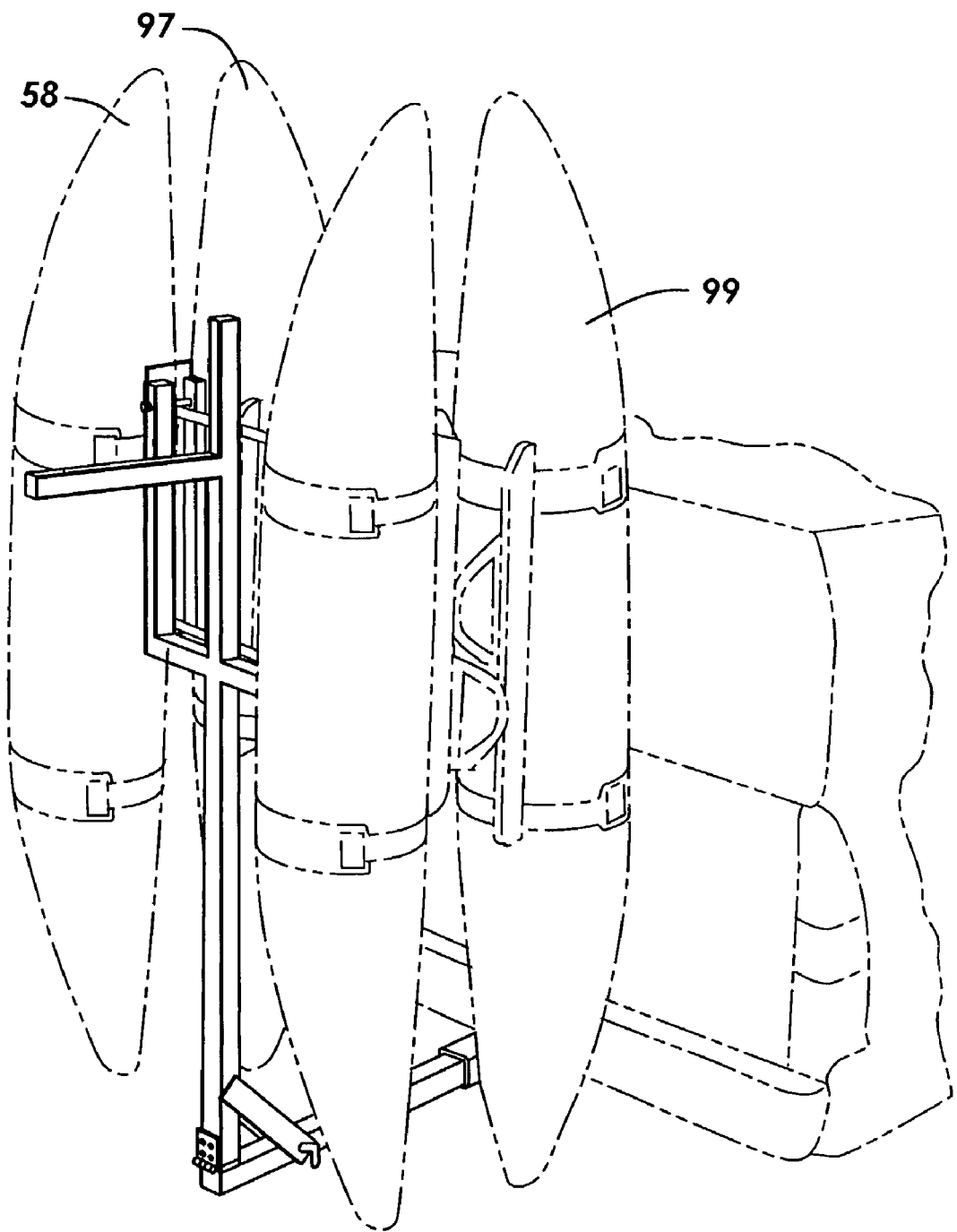
FIG. 7 is a side view perspective of an embodiment of a personal pontoon watercraft rack for transporting of two personal watercraft with two personal watercraft loaded.
Figure 8:
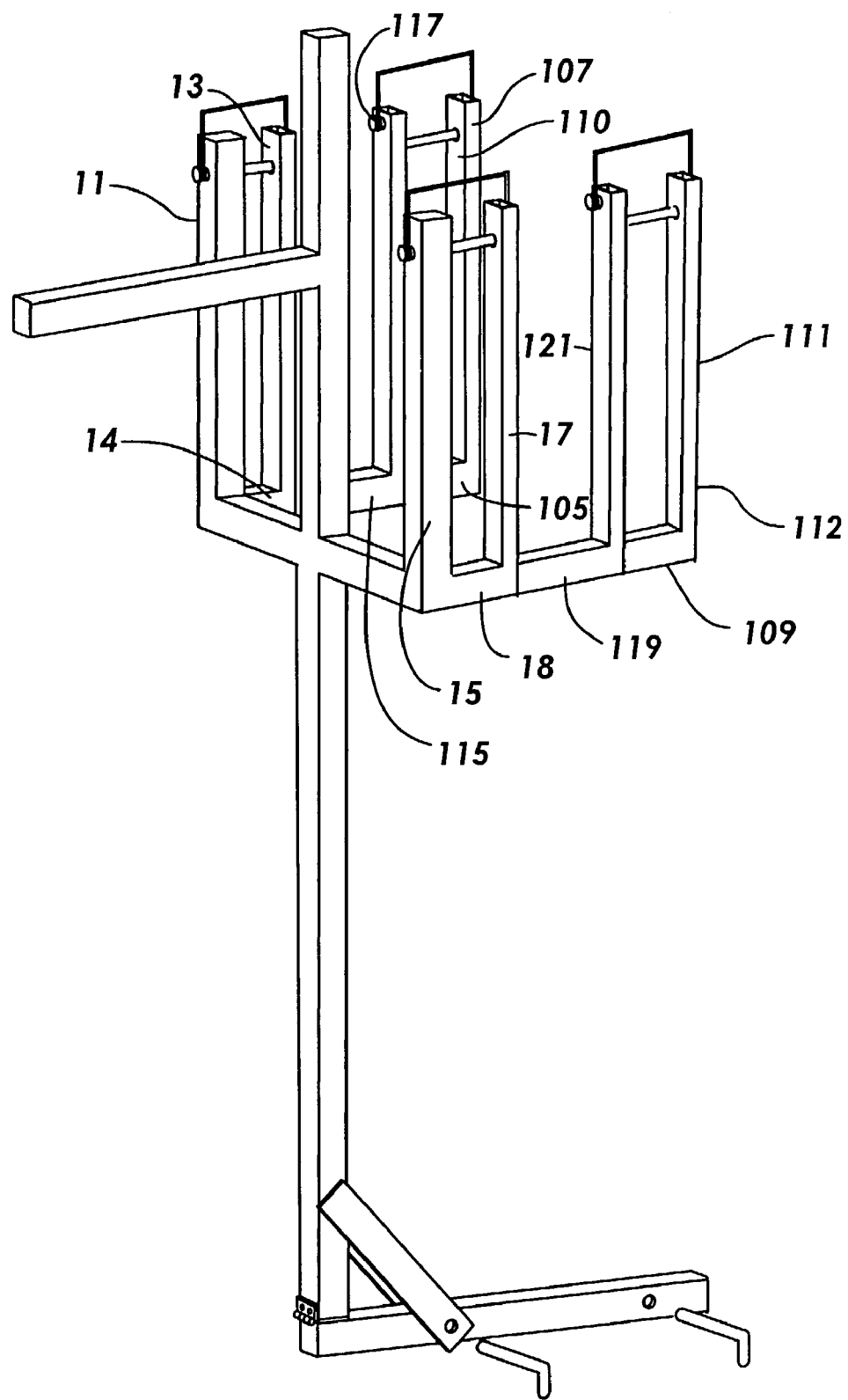
FIG. 8 is a side view perspective of an alternative embodiment of a personal pontoon watercraft rack for transporting of two personal watercraft.
Figure 9:
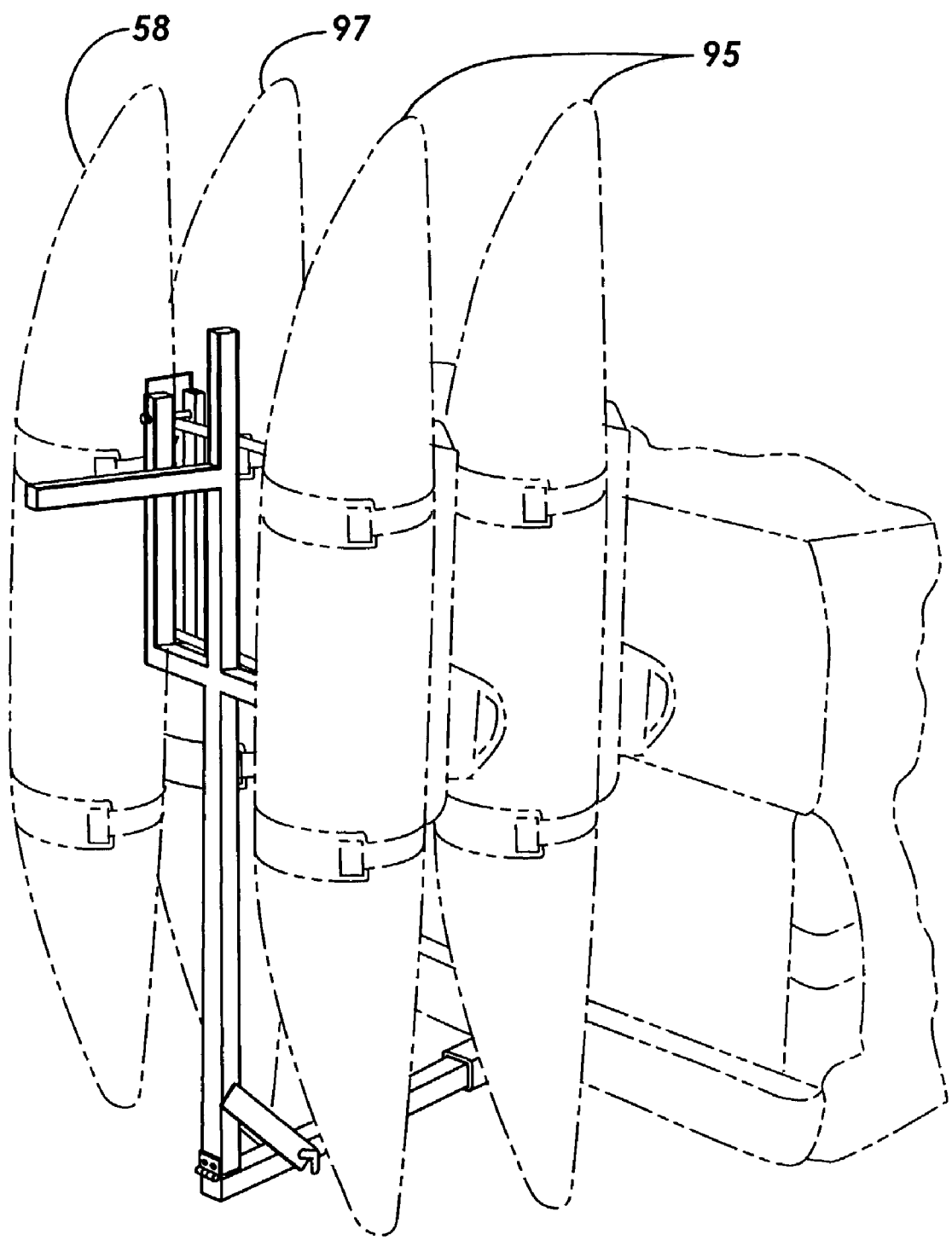
FIG. 9 is a side view perspective of an alternative embodiment of a personal pontoon watercraft rack for transporting of two personal watercraft with two personal watercraft loaded.

One embodiment of the present invention which provides for the transport of two watercraft 58 is shown in FIG. 6 and an alternative embodiment is shown in FIG. 8. These embodiments utilize two pairs of cradles. The embodiment shown in FIG. 8 provides for both watercraft to be loaded in an upright position 95 as shown in FIG. 9 and the embodiment shown in FIG. 6 requires that the second watercraft 97 be loaded in an inverted position 99 as shown in FIG. 7.

Referring to FIG. 6, this embodiment merely has a second left cradle cross member 105, a second left rear cradle member 107, a second right cradle cross member 109 and a second right rear cradle member 111. The left rear cradle member, the second left cradle cross member and the left second rear cradle member form a left second cradle 110 and the right rear cradle member, the right second cradle cross member and the right second rear cradle member form a right second cradle 112. The deck of the first watercraft is inserted in the left cradle and the right cradle respectively and the deck of the second watercraft is inserted in the left second cradle and the right second cradle respectively, with the second watercraft in an inverted position as shown in FIG. 7.

Referring to FIG. 8, this embodiment requires a left cradle extension member 115, a second left front cradle member 117, a second left cradle cross member 105, a second left rear cradle member 107, a right cradle extension member 119, a second right front cradle member 121, a second right cradle cross member 109 and a second right rear cradle member 111. The second left front cradle member, the second left cradle cross member, and the second left rear cradle member form a left second cradle 110 and the second right front cradle member, the second right cradle cross member, and the second right rear cradle member from a right second cradle 112.

Figure 15:
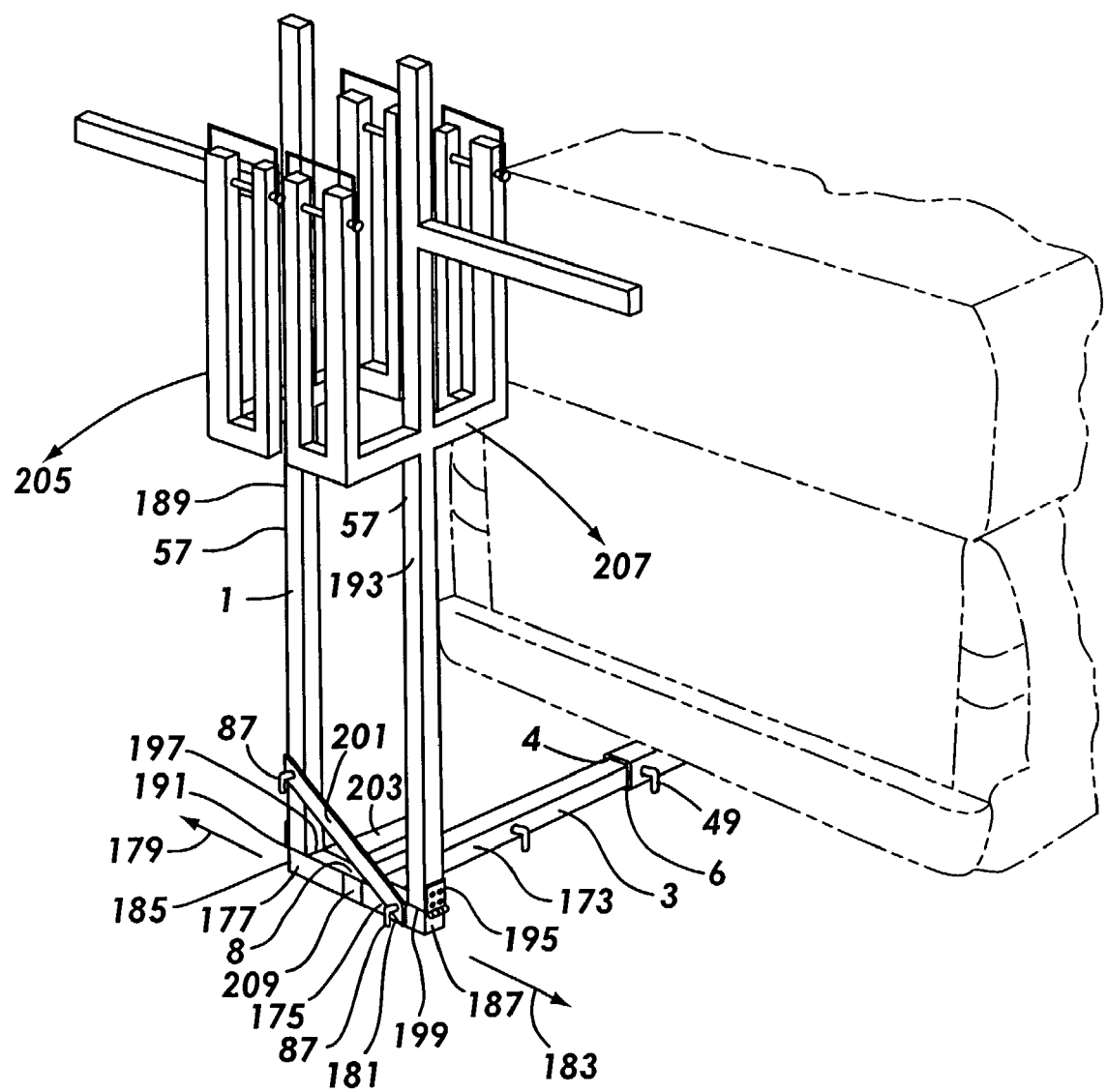
FIG. 15 is a side view perspective of an alternative embodiment of a personal pontoon watercraft rack for transporting two personal watercraft, with two support structures which pivot lateral.
Figure 17:
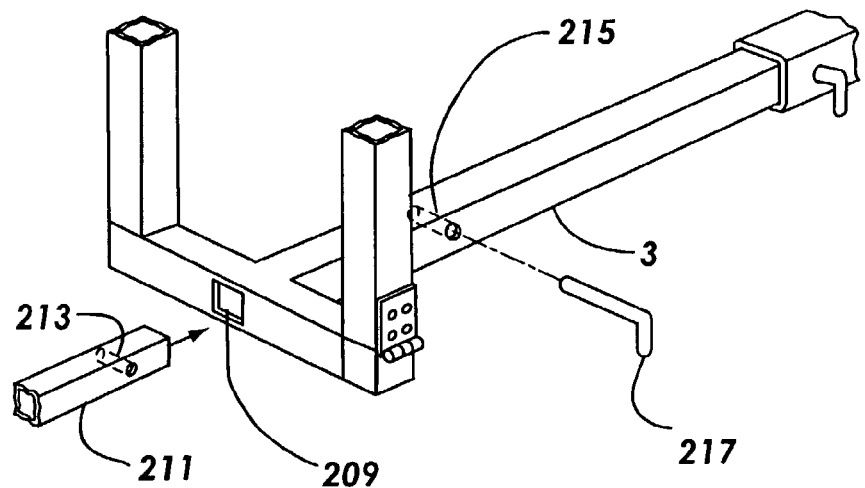
FIG. 17 is a side view perspective detail of an alternative structure for the rear end of a two watercraft rack, providing for piggybacking of racks.

Referring now to FIG. 15, another embodiment of the rack 1 is shown which is used for transport of two or more watercraft, which is a laterally pivoting embodiment. For this embodiment, the anchor member 3 has a longitudinal segment 173 with an insertion end 4 dimensioned for insertion in a trailer hitch receptacle 6, the anchor member having a rear end 8 and having a lateral segment 175 with a left lateral stub member 177 extending laterally to the left 179 and a right lateral stub member 181 extending laterally to the right 183 respectively from the rear end of the anchor member. The outside end 185 of the left lateral stub member is connected to the bottom end 197 of a left support structure 189 by a left pivot hinge 191 and the outside end 187 of the right lateral stub member is connected to the bottom end 199 of a right support structure 193 by a right pivot hinge 195. For the embodiment shown in FIG. 5, the left support structure and the right support structure are each comprised of the components described for the support structure shown in FIG. 1. A rear cross brace 201 and a front cross brace 203 couple the left support structure and the right support structure together in the transport position 57. Other means for bracing the left support structure and the right support structure in their respective transport positions will be obvious to persons skilled in the art. For example, a pair of support braces or a corner brace may connect the support member of the left support structure to the left lateral stub member and a second pair of support braces or a second corner brace may connect the support member of the right support structure to the right lateral stub member. The left support structure is pivoted laterally to the left 205 from the transport position to a load position and the right support structure is pivoted laterally to the right 207 from the transport position to the a load position. Referring also to FIG. 17, this embodiment can also have an optional anchor member receptacle 209 to allow the insertion of a second anchor member 211 of another rack, thereby providing for piggybacking of the racks. The second anchor member must be dimensioned to slide inside the anchor member 3 and can be secured in the anchor member by insertion of an anchor pin 217 through second anchor pin holes 213 in the second anchor member which are alined with anchor pin holes 215 in the anchor member.

Figure 16:
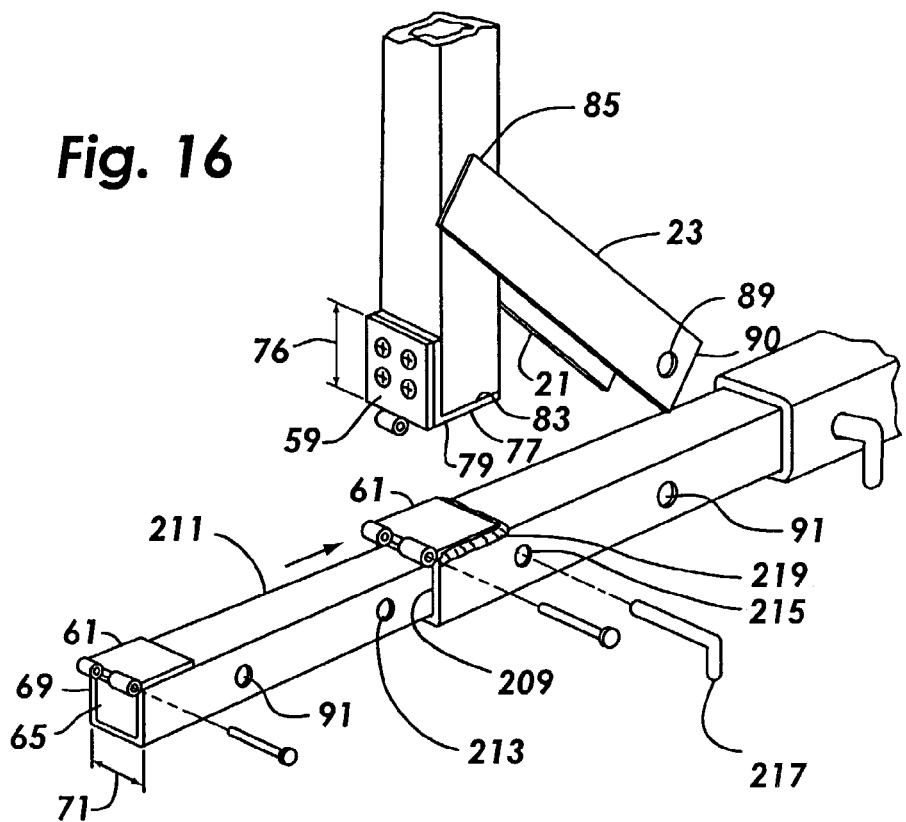
FIG. 16 is a side view perspective detail of an alternative structure for the rear end of the anchor member and the pivot hinge, providing for piggybacking of racks.

Similarly the embodiment of the rack shown in FIG. 1 can also be equipped with piggybacking means such as an optional anchor member receptacle 209 as shown in FIG. 16 to allow for piggybacking of a second rack by insertion of a second anchor member 211 which again is secured in the anchor member by insertion of an anchor pin 217 through second anchor pin holes 213 in the second anchor member which are alined with anchor pin holes 215 in the anchor member. For this embodiment, the pivot hinge 19 is preferably secured to the anchor member by a hinge weld 219, in order to provide for clearance inside the anchor member for the second anchor member to be inserted.

Multiple watercraft embodiments providing for the transport of more than two watercraft can be constructed in the manner illustrated for the embodiments shown in FIGS. 8 and 15. Referring to FIG. 8, this could be accomplished by adding another left cradle extension member 115 with another left cradle and another right cradle extension member 119 with another right cradle. Referring to FIG. 15, this could be accomplished by lengthening the lateral stub members 177, 181 and adding additional pairs of cradles to each support structure in the manner shown in FIG. 6 or FIG. 8.

Figure 12:
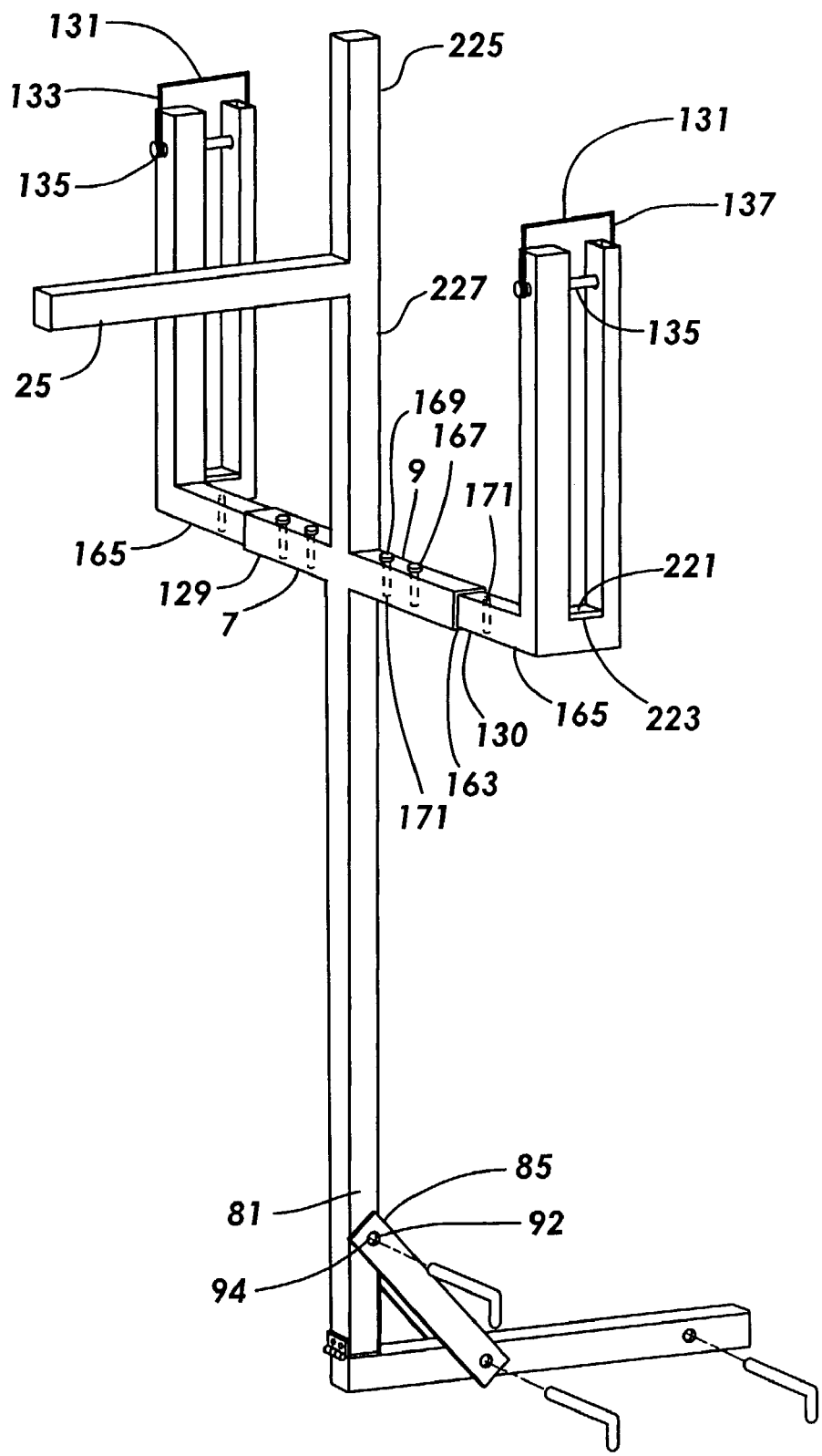
FIG. 12 is a side perspective view of an embodiment of a personal pontoon watercraft rack in a transport position with alternative support brace, optional retainer clips and optional cradle separation adjustment.

Optional features may also include cradle adjustment means such as the embodiment shown in FIG. 12, which incorporates a left cross extension member 129 and a right cross extension member 130 slidable in and out of cross member receptacles 163 and secured in an extended position 165 by cross member fasteners 167 inserted through cross member bolt receptacles 169 in the left cross member 7 and right cross member 9 respectively and extension member bolt receptacles 171 in the left cross extension member and the right cross extension member respectively as shown in FIG. 12.

Another optional feature is the addition of retainer clips 131 to secure the watercraft in place after it is loaded onto the rack. An embodiment of the retainer clip is shown in FIG. 12 with this embodiment providing for a left retainer clip 133 being inserted into retainer clip receptors 135 in the left front cradle member and the left rear cradle member respectively and the right retainer clip 137 being inserted in the retainer clip receptors in the right front cradle member and the right rear cradle member respectively. Other variations of the retainer clip and other retainer means will be known to persons skilled in the art.

Referring again to FIG. 3, a typical personal pontoon watercraft 58 is comprised of a pair of inflatable, streamlined pontoons 139, a deck 141, a pontoon connection structure 143 and a means for securing the pontoons to the pontoon connection structure. A common means are straps 142, usually two for each pontoon which are connected to buckles 144 which are permanently affixed to each side of the pontoons. These straps are then secured to the pontoon connection structure which in turn is attached to the deck. The watercraft is loaded onto the rack in the load position by sliding the deck 141 into the left cradle 12 and the right cradle 16 with the deck edges 157 extending beyond the left cradle outside edge and the right cradle outside edge respectively as shown in FIG. 3. Referring also to FIG. 1, the total length 159 of the left cross member and the right cross member is less than the deck width 161 to allow the insertion of the deck in the left cradle and the right cradle without a conflict with the deck support structure 143.

Figure 13:
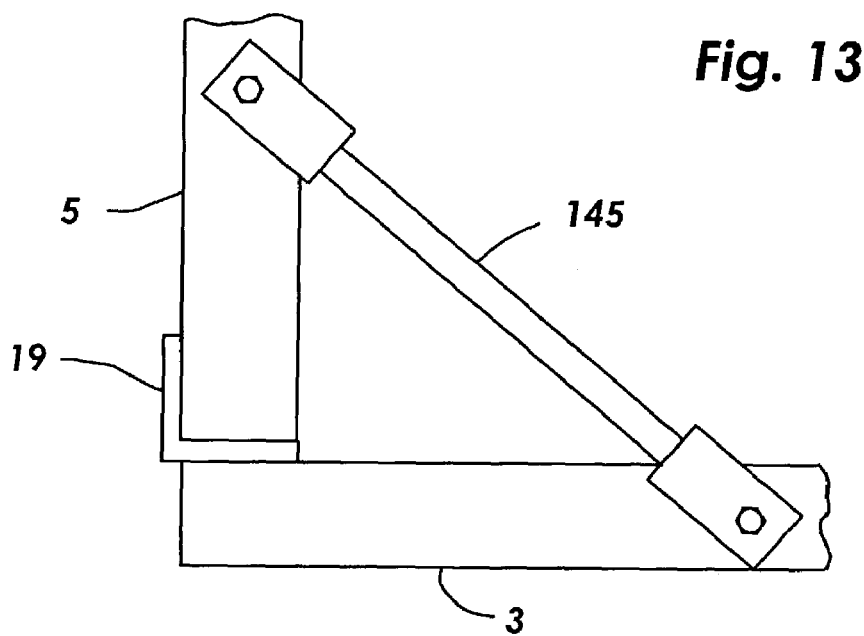
FIG. 13 is a side view detail of an alternative corner brace.
Figure 14:
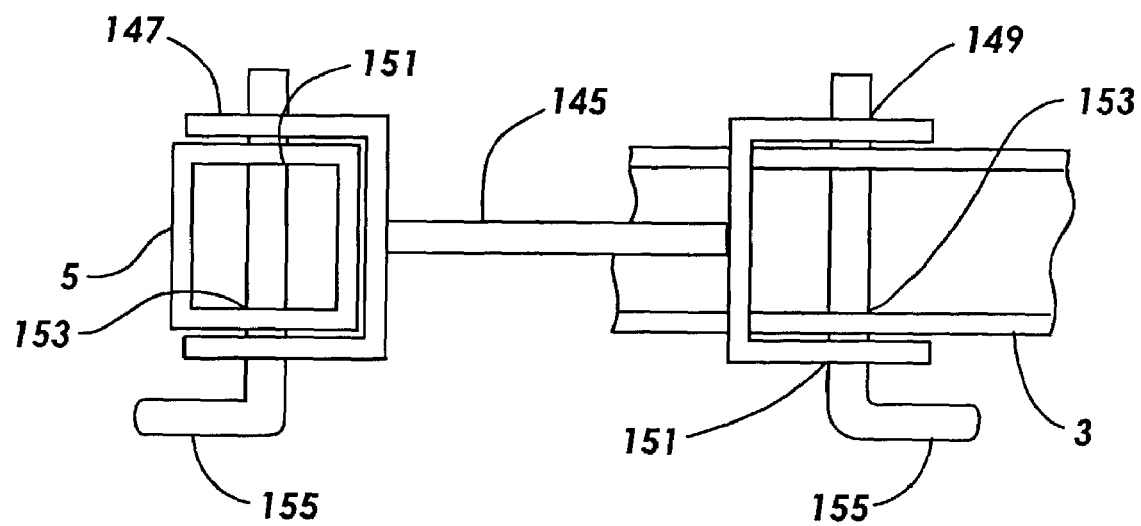
FIG. 14 is a top view detail of an alternative corner brace.

An alternative corner bracing means for securing the support structure in the transport position is shown in FIG. 13 and FIG. 14. A corner brace 145 which is comprised of a top brace bracket 147 and a bottom brace bracket 149. The top brace bracket can be secured to the support member by a permanent or removable brace pin 155 inserted through bracket pin holes 151 which are aligned with brace pin holes 153 in the support member. Likewise with the support member in the upright position the bottom brace bracket is secured to the anchor member by a brace pin 155 inserted through bracket pin holes 151 which are aligned with brace pin holes 153 in the anchor member. Also, the brace pins in the support member and the anchor member respectively can both be removable or one can be permanent with the other removable.

Other bracing means for securing the support structure in the transport position will be known to persons skilled in the art.

Referring again to FIG. 12, an optional cradle pad 221 can be installed on the top surface 223 of the left cradle cross member and the right cradle cross member to cushion the deck of the watercraft during transport. Also, optionally the support member extension 225 which extends beyond the support pedestal 25, which assists in sliding the watercraft deck into the cradle, can be eliminated. Further, optionally the support pedestal can be affixed to the support member where it connects to the left cross member and the right cross member, eliminating the portion of the support member 227 beyond the cross members.

Other embodiments of the present invention may use pivot means other than the pivot hinge illustrated in the drawings. Other types of hinges and other pivot means are known in the art that can provide for pivoting of the support structure between the load position and the transport position. Such pivot means may also provide for securing the support structure in the transport position without the use of a bracing means such as the support braces or corner braces.

Figure 18:
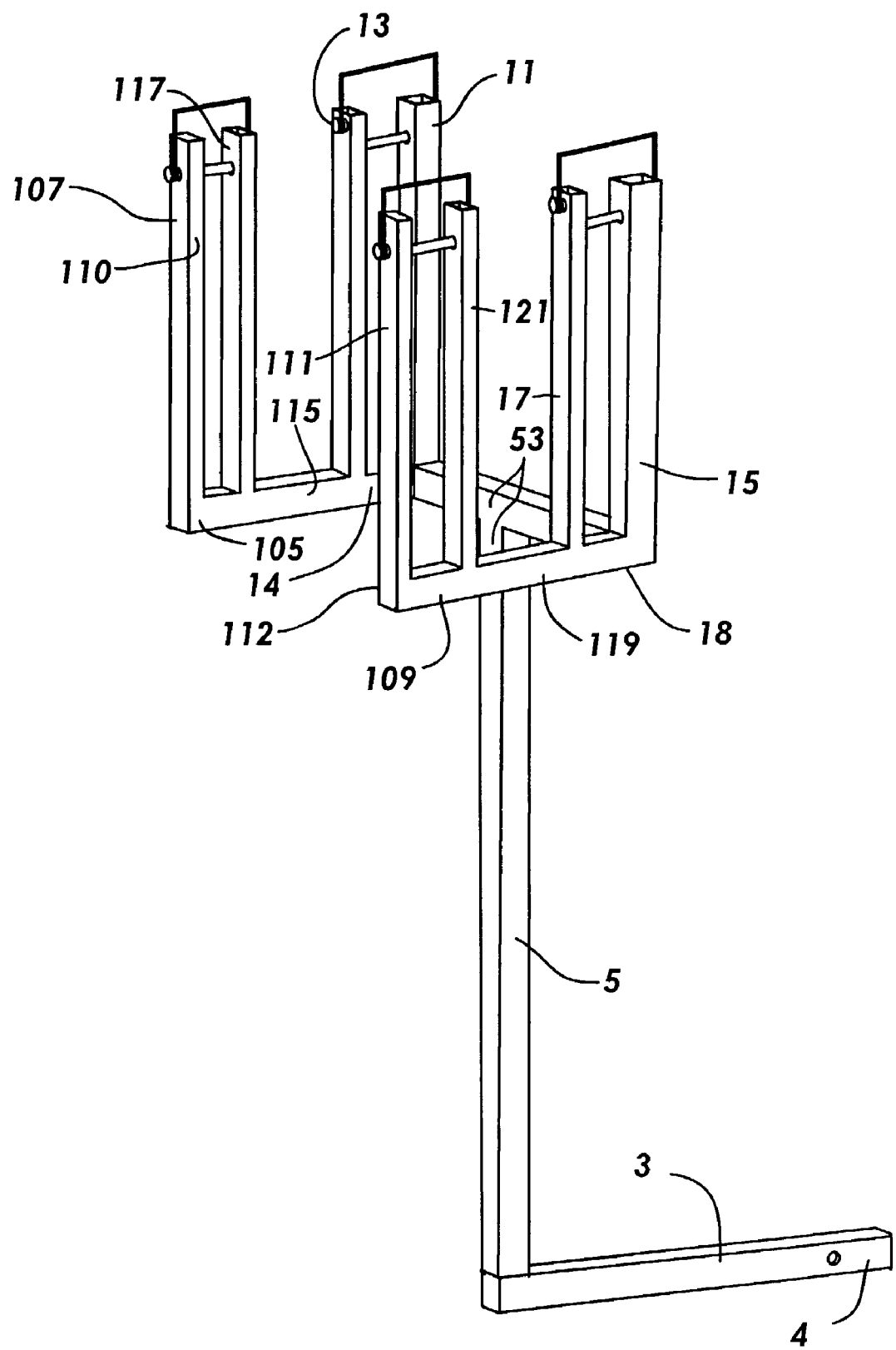
FIG. 18 is a side view perspective of a non-pivoting embodiment of a personal pontoon watercraft rack for transporting of two watercraft.

Simplified, non-pivoting embodiments of the present invention may provide for the support structure to be fixedly attached to the anchor member thereby providing for the rack to be fixedly maintained in the transport position. Referring to FIGS. 1, 6, 8, 12 and 15, simplified embodiments may be constructed without the pivot hinge 19 or other pivot means, with the support structure 53 being welded or fixedly attached to the anchor member 3 by other means known in the art. Such embodiments would also not utilize a support pedestal 25. Also, depending on the structural characteristics of the support member 5 and the anchor member 3 and the connection of these components, such simplified embodiments may also not utilize support braces 21, 23 or other means of securing the support structure in the transport position as such bracing may not be necessary for the structural integrity and stability of these simplified embodiments. Referring to FIG. 18, a non-pivoting embodiment is shown which illustrates that the support structure for the non-pivoting embodiments may extend rearward rather than forward as is required for the longitudinally pivoting embodiment shown in FIG. 1. These non-pivoting embodiments may also provide for the elimination of the support member extension, and the portion of the support member beyond the cross members along with the support pedestal as shown in FIG. 18. Non-pivoting embodiments for two or more watercraft may also be constructed with one or more connected pairs of cradles extending laterally in both directions from a common longitudinal cross member or extending longitudinally in both directions from a common lateral cross member, the common cross member being comprised of a common left cross member and a common right cross member.

Other embodiments with a more complex anchor means for securing the rack to a trailer hitch, such as a "Y" shaped or a "U" shaped anchor member, or with a more complex support means such as a "Y" shaped or a "U" shaped support member could be used.

Other embodiments and other variations and modifications of the embodiments described above will be obvious to a person skilled in the art. Therefore, the foregoing is intended to be merely illustrative of the invention and the invention is limited only by the following claims.

What is claimed is:

1. Rack for insertion in a trailer hitch for use in transporting a personal pontoon watercraft, the watercraft having a pair of pontoons, a watercraft deck with a deck depth and a deck length and a pontoon connection structure for securing the pontoons respectively to opposing sides of the watercraft deck, the trailer hitch having a trailer hitch receptacle, the rack comprising:

a) anchor member having an anchor member insertion end and an anchor member rear end, the anchor member insertion end being dimensioned for insertion in the trailer hitch receptacle;
   b) support structure comprised of a support member and a cradle structure affixed to the support member, the support member having a support member bottom end, the support structure having a roughly horizontal load position and a roughly vertical transport position, the cradle structure having a forked left cradle comprising a left front cradle member with a left front cradle member length and a left front cradle interior surface and a left rear cradle with a left rear cradle member length and a left rear cradle interior surface, and a forked right cradle comprising a right front cradle member with a right front cradle member length and a right front cradle interior surface and a right rear cradle member with a right rear cradle member length and a right rear cradle interior surface, the left cradle having a left cradle spacing between the left front cradle interior surface and the left rear cradle interior surface and the right cradle having a right cradle spacing between the right front cradle interior surface and the right rear cradle interior surface, the left front cradle member length, the left rear cradle member length, the right front cradle member length, the right rear cradle member length, the left cradle spacing and the right cradle spacing providing for the insertion of the watercraft deck into the cradle structure with the support structure in the load position and with the watercraft in a roughly horizontal position and for the engagement of the watercraft deck between the left rear cradle interior surface and the left front cradle interior surface and between the right rear cradle interior surface and the right front cradle interior surface, and providing for the continuing engagement of the watercraft deck and maintaining the orientation of the watercraft deck and the orientation of the watercraft with respect to the support structure as the support structure is pivoted from the load position to the transport position, thereby providing for pivoting the watercraft from a roughly horizontal position to a roughly vertical position; and
   c) pivot hinge pivotally attaching the support member bottom end to the anchor member rear end for pivoting of the support structure between the load position and the transport position.

2. Rack as recited in claim 1 further comprising bracing means for securing the support structure in the transport position.

3. Rack as recited in claim 2 wherein the bracing means comprises a pair of support braces with opposing ends attachable to the support member and the anchor member respectively with the support structure in the transport position.

4. Rack as recited in claim 2 wherein the bracing means comprises a corner brace with top brace bracket and bottom brace bracket attachable to the support member and the anchor member respectively with the support structure in the transport position.

5. Rack as recited in claim 1 further comprising a support pedestal which is affixed to the support member, the support pedestal extending roughly vertically below the support member when the support structure is in the load position.

6. Rack as recited in claim 1 further comprising one or more retainer clips for securing the deck of a watercraft in the cradle structure.

7. Rack as recited in claim 1 wherein the anchor member further comprises secure means for securing the anchor member insertion end in the trailer hitch receptacle.

8. Rack as recited in claim 1 wherein the anchor member insertion end has hitch pin holes on opposing sides of the anchor member insertion end positioned to align with hitch pin receptacles in the trailer hitch when the insertion end is inserted in the hitch receptacle, for insertion of a hitch pin through the trailer hitch and the anchor member insertion end.

9. Rack as recited in claim 1 wherein the cradle structure comprises a left cross member, a right cross member, the left cross member and the right cross member being affixed to opposing sides of the support member and the left cross member and the right cross member having a cross member axis which is transverse to the support member and to the anchor member, the left cradle being affixed to the outside end of the left cross member and the right cradle being affixed to the outside end of the right cross member, the left cradle having a left cradle outside surface and the right cradle having a right cradle outside surface, the cradle structure having an outside surface separation between the left cradle outside surface and the right cradle outside surface which is less than the width of the deck of the watercraft.

10. Rack as recited in claim 9 wherein the left cross member and the right cross member respectively further comprise cradle adjustment means for adjusting the respective lengths of the left cross member and the right cross member.

11. Rack as recited in claim 1 wherein the rear end of the anchor member has an anchor member receptacle for insertion of an anchor member insertion end of a second rack and means for securing the second rack to the rack.

12. Rack as recited in claim 1 wherein the cradle structure further comprises cradle adjustment means for adjusting the width of the cradle structure to accommodate personal pontoon watercraft with varying deck widths.

13. Rack for insertion in a trailer hitch for use in transporting a personal pontoon watercraft, the watercraft having a pair of pontoons, a watercraft deck with a deck depth and a deck length and a pontoon connection structure for securing the pontoons respectively to opposing sides of the watercraft deck, the trailer hitch having a trailer hitch receptacle, the rack comprising:
   a) anchor member having an anchor member insertion end and an opposing anchor member rear end, the anchor member insertion end having a cross section dimensioned for insertion in the trailer hitch receptacle and having hitch pin holes for securing the anchor member in the trailer hitch receptacle;
   b) support structure having a roughly horizontal load position and a roughly vertical transport position, the support structure comprising a support member, a left cross member, a right cross member, a left cradle and a right cradle, the left cross member and the right cross member being affixed to opposing sides of the support member and the left cross member and the right cross member having a cross member axis which is transverse to the support member and to the anchor member, the left cradle being affixed to the outside end of the left cross member and the right cradle being affixed to the outside end of the right cross member, the left cradle having a left cradle outside surface and the right cradle having a right cradle outside surface, the support structure having an outside surface separation between the left cradle outside surface and the right cradle outside surface which is less than the width of the deck of the watercraft, the left cradle and the right cradle being forked, the left cradle comprising a left front cradle member with a left front cradle member length and a left front cradle interior surface and a left rear cradle with a left rear cradle member length and a left rear cradle interior surface, the right cradle comprising a right front cradle member with a right front cradle member length and a right front cradle interior surface and a right rear cradle member with a right rear cradle member length and a right rear cradle interior surface, the left cradle having a left cradle spacing between the left front cradle interior surface and the left rear cradle interior surface and the right cradle having a right cradle spacing between the right front cradle interior surface and the right rear cradle interior surface, the left front cradle member length, the left rear cradle member length, the right front cradle member length, the right rear cradle member length, the left cradle spacing and the right cradle spacing providing for the insertion of the watercraft deck in the support structure with the support structure in the load position and with the watercraft in a roughly horizontal position and for the engagement of the watercraft deck between the left rear cradle interior surface and the left front cradle interior surface and between the right rear cradle interior surface and the right front cradle interior surface, and providing for the continuing engagement of the watercraft deck and maintaining the orientation of the watercraft deck and the orientation of the watercraft with respect to the support structure as the support structure is pivoted from the load position to the transport position, thereby providing for pivoting the watercraft from a roughly horizontal position to a roughly vertical position;
   c) pivot hinge affixed to the support member bottom end and the anchor member rear end, the pivot hinge having a transverse axis of rotation, the support structure pivoting between the load position and the transport position; and
   d) bracing means for securing the rack in the transport position.

14. Rack as recited in claim 13 further comprising a support pedestal which is affixed to the support member, the support pedestal extending roughly vertically below the support member when the support structure is in the load position.

15. Rack as recited in claim 13 further comprising one or more retainer clips for securing the deck of a watercraft in the cradle structure.

16. Rack as recited in claim 13 wherein the bracing means comprises a pair of support braces with opposing ends attachable to the support member and the anchor member respectively with the support structure in the transport position.

17. Rack as recited in claim 13 wherein the bracing means comprises a corner brace with top brace bracket and bottom brace bracket attachable to the support member and the anchor member respectively with the support structure in the transport position.

18. Rack as recited in claim 13 wherein the rear end of the anchor member has an anchor member receptacle for insertion of an anchor member insertion end of a second rack and means for securing the second rack to the rack.

19. Rack as recited in claim 13 wherein the support structure further comprises cradle adjustment means for adjusting the width of the cradle structure to accommodate personal pontoon watercraft with varying deck widths.

20. Rack as recited in claim 13 wherein the left cross member and the right cross member respectively further comprise cradle adjustment means for adjusting the respective lengths of the left cross member and the right cross member.

21. Rack for use in transporting a personal pontoon watercraft, the watercraft having a pair of pontoons, a watercraft deck and a pontoon connection structure for securing the pontoons respectively to opposing sides of the deck, the trailer hitch having a trailer hitch receptacle, the rack comprising:
   a) anchor means for securing the rack to a trailer hitch receptacle;
   b) one or more support means, each support means having a load position and a transport position, each support means having one or more cradle means, each cradle means providing for receiving and engaging the watercraft deck with the watercraft in a horizontal position when the support means is in the load position and providing for the continuing engagement of the watercraft deck and maintaining the orientation of the watercraft deck and the orientation of the watercraft with respect to the support means as the support means is pivoted from the load position to the transport position, thereby providing for pivoting the watercraft from a roughly horizontal position to a roughly vertical position, each cradle means comprising a left cross member, a right cross member, a left cradle and a right cradle, the left cross member and the right cross member being affixed to opposing sides of the support member and the left cross member and the right cross member having a cross member axis which is transverse to the support member and to the anchor member, the left cradle being affixed to the outside end of the left cross member and the right cradle being affixed to the outside end of the right cross member, the left cradle having a left cradle outside surface and the right cradle having a right cradle outside surface, the cradle means having an outside surface separation between the left cradle outside surface and the right cradle outside surface which is less than the width of the deck of the watercraft; and c) one or more pivot means for connecting each support means respectively to the anchor means and for pivoting of each support means respectively between its load position and the transport position.

22. Rack as recited in claim 21 further comprising bracing means for securing the support means in the transport position.

23. Rack as recited in claim 21 further comprising a support pedestal which is affixed to each support means, the support pedestal extending roughly vertically below the support means when the support means is in the load position.

24. Rack as recited in claim 21 further comprising retainer means for securing the deck of the watercraft in a respective cradle structure.

25. Rack as recited in claim 21 wherein the anchor means includes secure means for securing the anchor means to the trailer hitch.

26. Rack as recited in claim 21 further comprising piggybacking means for attaching and securing a second rack to the rack.

27. Rack as recited in claim 21 wherein each cradle means further comprises cradle adjustment means for adjusting the width of the cradle means to accommodate personal pontoon watercraft with varying deck widths.

28. Rack as recited in claim 21 wherein each left cross member and the right cross member respectively further comprise cradle adjustment means for adjusting the respective lengths of the left cross member and the right cross member.

29. Rack for insertion in a trailer hitch for transporting one or more personal pontoon watercraft, each of the watercraft having a pair of pontoons, a watercraft deck with a deck depth and a deck length and a pontoon connection structure for securing the pontoons respectively to opposing sides of the watercraft deck, the trailer hitch having a trailer hitch receptacle, the rack comprising:

a) anchor member having an anchor member insertion end and an anchor member rear end, the anchor member insertion end being dimensioned for insertion in the trailer hitch receptacle;

b) support structure comprised of a support member and one or more cradle structures affixed to the support member for receiving and engaging the deck of one or more respective watercraft, the support member having a support member bottom end, the support structure having a roughly horizontal load position and a roughly vertical transport position, and each cradle structure having a forked left cradle comprising a left front cradle member with a left front cradle member length and a left front cradle interior surface and a left rear cradle with a left rear cradle member length and a left rear cradle interior surface, and a forked right cradle comprising a right front cradle member with a right front cradle member length and a right front cradle interior surface and a right rear cradle member with a right rear cradle member length and a right rear cradle interior surface, the left cradle having a left cradle spacing between the left front cradle interior surface and the left rear cradle interior surface and the right cradle having a right cradle spacing between the right front cradle interior surface and the right rear cradle interior surface, the left front cradle member length, the left rear cradle member length, the right front cradle member length, the right rear cradle member length, the left cradle spacing and the right cradle spacing providing for the insertion of the watercraft deck into the cradle structure with the support structure in the load position and with the watercraft in a roughly horizontal position and for the engagement of the watercraft deck between the left rear cradle interior surface and the left front cradle interior surface and between the right rear cradle interior surface and the right front cradle interior surface, and providing for the continuing engagement of the watercraft deck and maintaining the orientation of the watercraft deck and the orientation of the watercraft with respect to the support structure as the support structure is pivoted from the load position to the transport position, thereby providing for pivoting the watercraft from a roughly horizontal position to a roughly vertical position; and c) pivot hinge pivotally attaching the support member bottom end to the anchor member rear end, the support structure pivoting between the load position and the transport position.

30. Rack as recited in claim 29 further comprising bracing means for securing the support structure in the transport position.

31. Rack as recited in claim 29 further comprising a support pedestal which is affixed to the support member, the support pedestal extending roughly vertically below the support member when the support structure is in the load position.

32. Rack as recited in claim 29 further comprising one or more retainer clips for securing the deck of a watercraft in one or more of the cradle structures.

33. Rack as recited in claim 29 wherein the anchor member further comprises secure means for securing the anchor member insertion end in the trailer hitch receptacle.

34. Rack as recited in claim 29 wherein the anchor member insertion end has hitch pin holes on opposing sides of the anchor member insertion end positioned to align with hitch pin receptacles in the trailer hitch when the insertion end is inserted in the hitch receptacle, for insertion of a hitch pin through the trailer hitch and the anchor member insertion end.

35. Rack as recited in claim 29 wherein the bracing means comprises a pair of support braces with opposing ends attachable to the support member and the anchor member respectively with the support structure in the transport position.

36. Rack as recited in claim 29 wherein the bracing means comprises a corner brace with top brace bracket and bottom brace bracket attachable to the support member and the anchor member respectively with the support structure in the transport position.

37. Rack as recited in claim 29 wherein the rear end of the anchor member has an anchor member receptacle for insertion of an anchor member insertion end of a second rack and means for securing the second rack to the rack.

38. Rack as recited in claim 29 wherein each cradle structure comprises a left cross member, a right cross member, one or more pairs of cradles, the left cross member and the right cross member being affixed to opposing sides of the support member and the left cross member and the right cross member having a cross member axis which is transverse to the support member and to the anchor member, each left cradle being connected to the outside end of the left cross member and each right cradle being affixed to the outside end of the right cross member, the left cradle having a left cradle outside surface and the right cradle having a right cradle outside surface, the cradle structure having an outside surface separation between the left cradle outside surface and the right cradle outside surface for each pair of cradles which is less than the width of the deck of the watercraft.

39. Rack as recited in claim 38 wherein each left cross member and each right cross member respectively further comprise cradle adjustment means for adjusting the respective lengths of the left cross member and the right cross member.

40. Rack as recited in claim 29 wherein the cradle structures each further comprises cradle adjustment means for adjusting the width of each of the cradle structures to accommodate personal pontoon watercraft with varying deck widths.

41. Rack for insertion in a trailer hitch for transporting two or more personal pontoon watercraft, each of the watercraft having a pair of pontoons, a watercraft deck and a pontoon connection structure for securing the pontoons respectively to opposing sides of the watercraft deck, the trailer hitch having a trailer hitch receptacle, the rack comprising:
  a) anchor member having a longitudinal segment with an anchor member insertion end dimensioned for insertion in the trailer hitch receptacle, the anchor member having an anchor member rear end and having a lateral segment with a left lateral stub member extending laterally to the left and a right lateral stub member extending laterally to the right from the anchor member rear end, each of the lateral stub members having an outside end;
  b) a pair of support structures, a left support structure and a right support structure, each support structure comprised of a support member and a cradle structure affixed to the support member, the support member having a bottom end, the support structure having a roughly horizontal load position and a roughly vertical transport position, the cradle structure having a left cradle and right cradle, the left cradle and the right cradle providing for the insertion of the watercraft deck into the cradle structure with the support structure in the load position and with the watercraft in a roughly horizontal position and for the engagement of the watercraft deck and providing for continuing engagement of the watercraft deck in a roughly vertical position with the support structure in the transport position; and
  c) two pivot hinges, each pivot hinge pivotally attaching the bottom end of a respective support member to the outside end of a respective lateral stub member, each pivot hinge having a longitudinal axis of rotation, the respective support structures pivoting laterally between a load position and a transport position.

42. Rack as recited in claim 41 further comprising bracing means for securing each support structure in the transport position.

43. Rack as recited in claim 42 wherein the bracing means comprises one or more pairs of support braces.

44. Rack as recited in claim 42 wherein the bracing means comprises one or more corner braces.

45. Rack as recited in claim 41 further comprising two support pedestals, one support pedestal respectively being affixed to each support member, the support pedestal extending roughly vertically below the support member when the support structure is in the load position.

46. Rack as recited in claim 41 further comprising one or more retainer clips for securing the deck of a watercraft in each cradle structure.

47. Rack as recited in claim 41 wherein the anchor member further comprises secure means for securing the anchor member insertion end in the trailer hitch receptacle.

48. Rack as recited in claim 41 wherein the anchor member insertion end has hitch pin holes on opposing sides of the anchor member insertion end positioned to align with hitch pin receptacles in the trailer hitch when the insertion end is inserted in the hitch receptacle, for insertion of a hitch pin through the trailer hitch and the anchor member insertion end.

49. Rack as recited in claim 41 wherein the rear end of the anchor member has an anchor member receptacle for insertion of an anchor member insertion end of a second rack and means for securing the second rack to the rack.

50. Rack as recited in claim 41 wherein each cradle structure comprises a left cross member and a right cross member, the left cross member and the right cross member being affixed to opposing sides of the support member and the left cross member and the right cross member having a cross member axis which is transverse to the support member and to the anchor member, the left cradle being affixed to the outside end of the left cross member and the right cradle being affixed to the outside end of the right cross member, the left cradle having a left cradle outside surface and the right cradle having a right cradle outside surface, the cradle structure having an outside surface separation between the left cradle outside surface and the right cradle outside surface which is less than the width of the deck of the watercraft.

51. Rack as recited in claim 50 wherein the left cross member and the right cross member of each cradle structure respectively further comprise cradle adjustment means for adjusting the respective lengths of the left cross member and the right cross member.

52. Rack as recited in claim 42 wherein each cradle structure further comprises cradle adjustment means for adjusting the width of the cradle structure to accommodate personal pontoon watercraft with varying deck widths.

* * * * *